United States Patent [19]

Torras

[11] Patent Number: 4,876,846

[45] Date of Patent: Oct. 31, 1989

[54] MOWER WITH TANDEM PUMPS

[75] Inventor: Robert M. Torras, St. Simons Island, Ga.

[73] Assignee: Kut Kwick Corporation, Brunswick, Ga.

[21] Appl. No.: 914,712

[22] Filed: Oct. 2, 1986

[51] Int. Cl.⁴ .................... A01D 34/66; A01D 34/80
[52] U.S. Cl. .................... 56/11.9; 56/16.2; 56/DIG. 22
[58] Field of Search .............. 56/11.9, 10.7, 11.1, 56/15.8, 15.7, DIG. 10, 11.6, DIG. 22, 16.2

[56] References Cited

U.S. PATENT DOCUMENTS

| | | | |
|---|---|---|---|
| 3,154,903 | 11/1964 | Smith | 56/15.8 |
| 3,177,683 | 4/1965 | Johnson | 56/7 |
| 3,205,642 | 9/1965 | Smith | 56/11.9 |
| 3,548,951 | 12/1970 | Weasel, Jr. et al. | 56/10.5 |
| 3,570,227 | 3/1971 | Bellinger | 56/11.9 |
| 3,729,910 | 5/1973 | Hardee | 56/11.9 |
| 3,742,685 | 7/1973 | Lion et al. | 56/11.1 |
| 4,009,556 | 3/1977 | Molzahn | 56/10.7 |
| 4,035,995 | 7/1977 | Arnblock | 56/11.6 |
| 4,068,452 | 1/1978 | Schaefer et al. | 56/11.6 |
| 4,308,713 | 1/1982 | James | 56/11.9 |
| 4,316,356 | 2/1982 | Planeta | 56/DIG. 22 |
| 4,416,109 | 11/1983 | Slayas | 56/DIG. 22 |
| 4,487,006 | 12/1984 | Scag | 56/10.7 |

OTHER PUBLICATIONS

The Super-Slope Master, Kut-Kwick Brochure, 2 pp.
Mower Master Price List, Kut Kwick, 12 pp.
Owners Manual, Kut-Kwick, 87 pp.
Kut-Kwick Owners' Manual, Selected Pages, Model SSM23-72, Kut Kwick, Inc., Brunswick, GA.

Primary Examiner—Paul J. Hirsch
Attorney, Agent, or Firm—Thomas & Kennedy

[57] ABSTRACT

The mower 10 has a rearwardly positioned power unit 11 and a forwardly positioned cutter unit 12 which are pivotably connected together by pivot mount 40. Tandem pumps 24, 25 and 26 are mounted to internal combustion engine 15 and extend parallel to the pivot axis 41 and project into the space above the arc of rotation of the cutter unit 12.

19 Claims, 3 Drawing Sheets

MOWER WITH TANDEM PUMPS

BACKGROUND OF THE INVENTION

The invention disclosed herein relates to mowers of the type adapted for cutting grass and other vegetation on sloped surfaces, with the mower having a rearwardly positioned power unit and a forwardly positioned cutter unit with rear driving wheels powered by fluid driven motors driven by reversible variable speed pumps. More particularly, the invention relates to the mounting arrangement of the pumps which drive the wheel motors, with the pumps being mounted on the power unit in front of the driving engine of the power unit, with the pumps projecting forwardly from the power unit over the cutter unit so that the weight of the pumps is positioned forwardly of the power unit and tends to locate the center of gravity of the mower further forward and reduces the likelihood of tipping the mower over when operating on a steeply sloped surface.

DESCRIPTION OF THE PRIOR ART

Riding mowers of several designs are commonly used for the purpose of cutting grass and other vegetation. One of the mower designs that has been particularly successful in mowing sloped surfaces includes a rearwardly positioned power unit and a forwardly positioned cutter unit. The power unit includes a chassis which is supported by driving wheels, and the chassis supports the engine and the operator's seat, whereas the cutter unit includes a cutter housing which is supported by caster wheels and the cutter housing supports the cutting blades. The engine mounted on the power unit drives the rear wheels by driving reversible, variable volume pumps, with a pump controlling the movement of a hydraulic motor which drives each rear wheel. The engine also drives the blades of the cutter unit. The direction of movement of the mower is controlled by the relative speed of the two rear drive wheels of the mower. This provides more positive control of the mower when operating on sloped terrain than the more conventional steerable front wheels arrangement.

Some of the rear drive slope mowers described above also include a pivot mount between the cutter unit and the power unit, whereby these units can pivot with respect to each other about a longitudinal axis. This permits the cutter unit and the power unit to each independently follow the level of the terrain over which they move, so that all wheels of the mower engage the ground simultaneously, thereby providing more accurate cutting of the vegetation and providing additional stability and safety to the operator.

The rear power unit mowers are particularly adapted for cutting sloped terrain, especially the sloped shoulders of highways. Usually, the operator of the slope mower attempts to cut along a horizontal path, with the mower "crabbing" at an upwardly sloped attitude but travelling along a horizontal path, so as to allow for the tendency of the mower to drift in a downhill direction. This attitude of the mower, together with the many other inclined attitudes typically assumed by such a mower during turning and other maneuvers on a sloped surface creates the hazard of overturning the mower. Even though this type of slope mower has a relatively light front cutting unit and a heavier rear power unit which makes it a well balanced and highly maneverable unit for slope mowing, it is still important that the components of the mower be sized and located so that the mower is not very long and can run in a short turning radius and so as to create a center of gravity that is as low as possible and positioned centrally between the sides of the mower and forwardly of the rear driving wheels.

SUMMARY OF THE INVENTION

Briefly described, the present invention comprises a mower of the type that includes a rear power unit and a front cutter unit, with the engine mounted to the power unit and with hydraulic motors arranged to drive the rear wheels of the power unit. Pumps are supported by the power unit and positioned in front of the engine and suspended over the front cutter unit. The pumps are utilized to drive the wheels of the power unit, and optionally are used to drive the cutter blades of the cutter unit. Preferably, the engine and pumps are arranged in series or tandem relationship, with the pumps aligned along the length of the mower, at equal distances from the side portions of the mower. The relatively low, aligned positions of the pumps and the engine create a low center of gravity of the mower that is positioned well forward of the rear driving wheels of the power unit, and is positioned centrally from side to side of the mower, which tends to locate the center of gravity of the mower at a position which enhances the stability of the mower during operation, particularly when in an inclined attitude, and when turning on a sloped surface. The extension of the pumps from the power unit over the cutter unit allows the pumps to utilize the space over a cutter deck which tilts or floats with respect to the power unit.

The preferred embodiment of the invention includes a pivot mounting between the power unit and the cutter unit, such that the cutter unit pivots about a longitudinal axis with respect to the power unit. The pumps which are supported by the power unit are positioned over the longitudinal pivot axis of the mower, with the pumps being located outside the arc of movement of the cutter unit with respect to the power unit. Therefore, the pumps are supported in an otherwise substantially unuseable space over the pivotable cutter unit, yet the pumps are positioned forward of the engine so as to locate the center of gravity further forward of the rear driving wheels of the mower.

Thus, it is an object of this invention to provide a mower which is well balanced and has less tendency to overturn when mowing along a slope or when turning on a sloped surface.

Another object of this invention is to provide a slope mower with the blades mounted in front of the engine and independently controlled rear drive wheels, which utilizes pumps driven by the engine for propelling the rear drive wheels and the cutter blades of the mower, which is inexpensive to produce and to maintain, and which has a center of gravity more suitable for maintaining the mower in an upright attitude when operating on steeply sloped surfaces.

Another object of this invention is to provide a slope mower that has a power unit with an internal combusion engine that drives pumps arranged in tandem relationship with respect to the engine and which are supported by the power unit over the forwardly positioned cutter unit so as to locate the center of gravity of the entire mower in a forward position.

DETAILED DESCRIPTION

Figure 1:
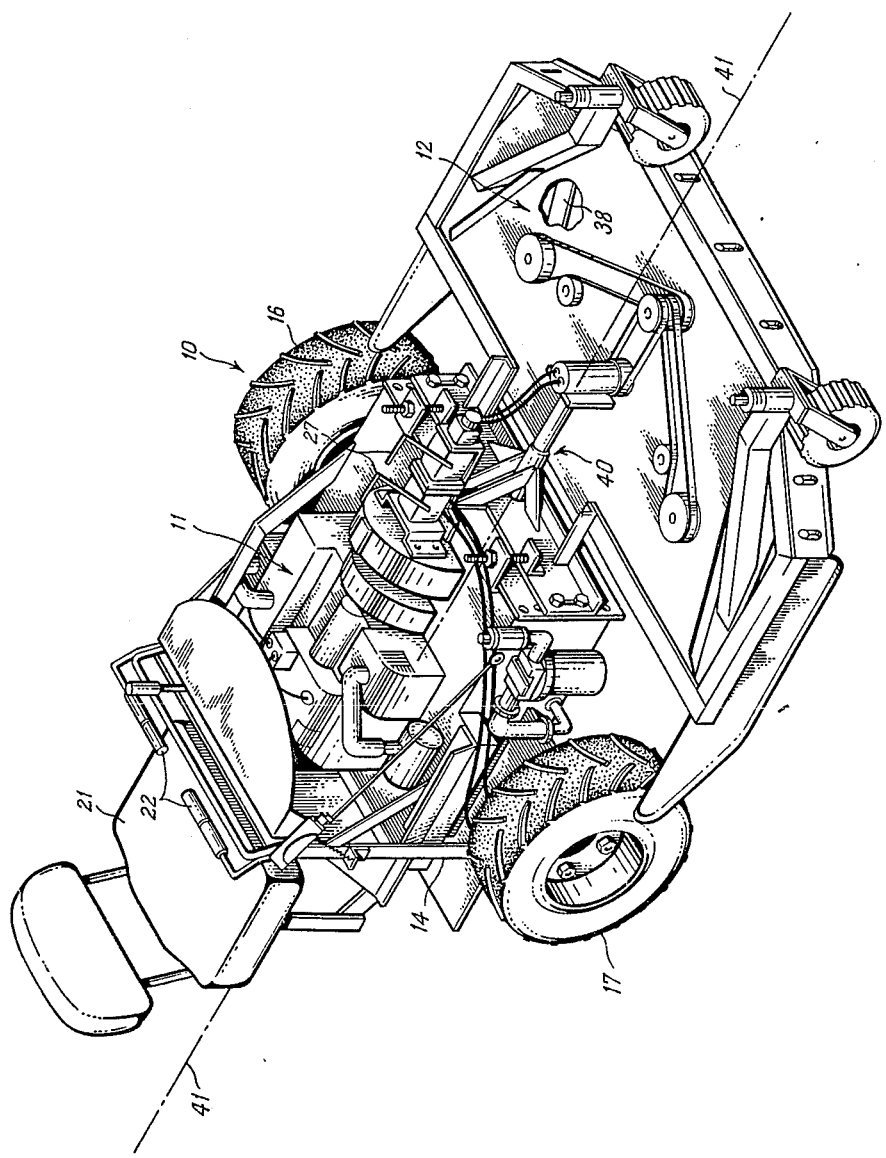
FIG. 1 is a perspective illustration of the slope mower with tandem pumps, showing the rear power unit and the forward cutter unit and the tandem pumps mounted forwardly of the engine and supported by the rear power unit.
Figure 2:
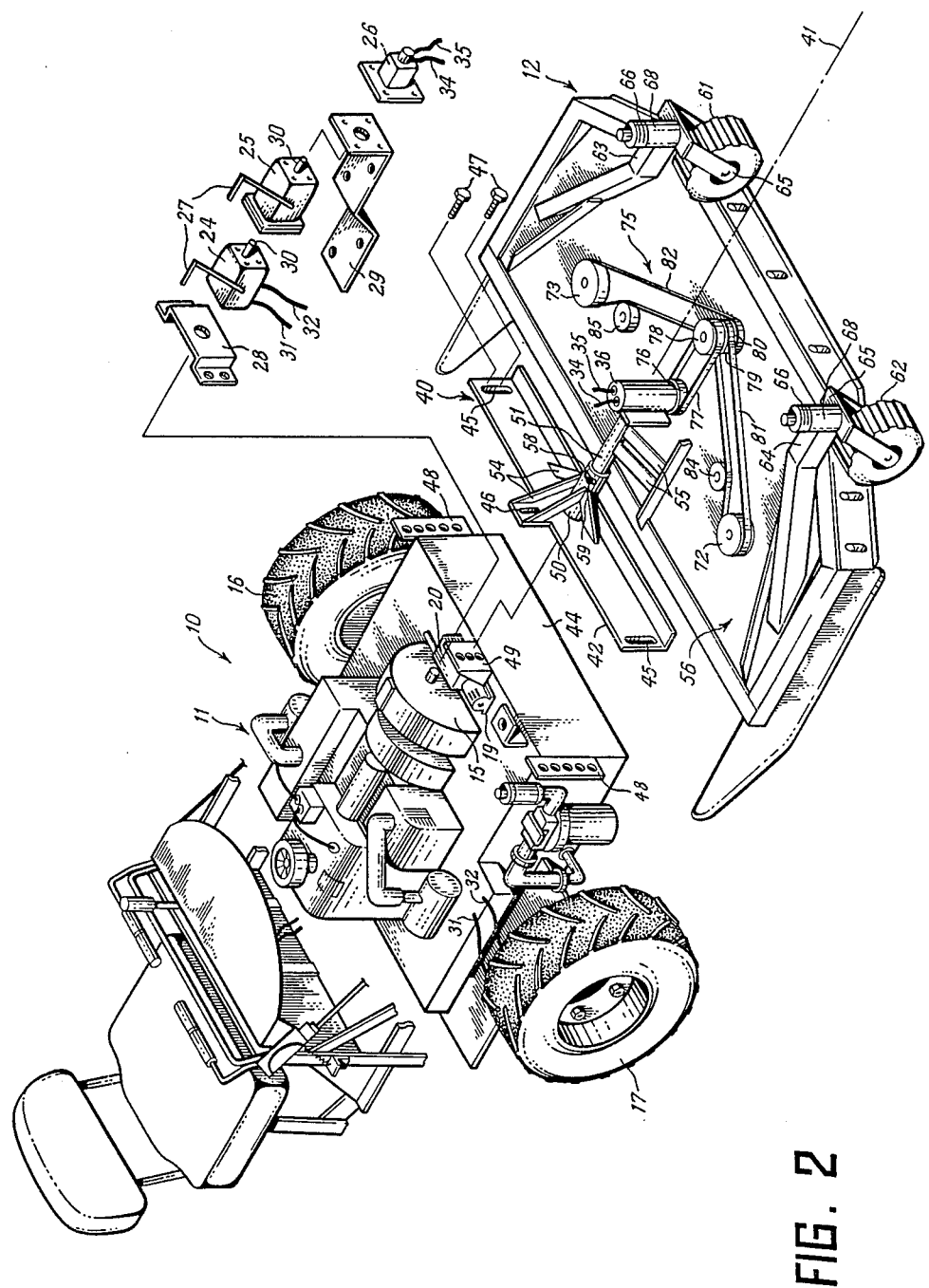
FIG. 2 is an exploded view of the slope mower, showing the manner in which the tandem pumps are to be mounted to the power unit.

Referring now in more detail to the drawings, in which like numerals indicate like parts throughout the several views, FIG. 1 illustrates the slope mower 10 which includes a power unit 11 and a cutter unit 12. The power unit is positioned rearwardly of the cutter unit 12 and includes a chassis 14 on which the various components of the power unit are mounted. For example, internal combustion engine 15 is located along the centerline of the chassis, and the rear driving wheels 16 and 17 of the mower are rotatably mounted at opposite sides of the chassis. Hydraulic motors 19 (only one shown) are arranged to drive each rear driving wheel, and the motors 19 operate through a conventional gear box 20 which drives the axle of each wheel. The driver's seat 21 is mounted rearwardly of engine 15 on chassis 14.

A series of pumps, such as pumps 24, 25 and 26, are mounted in any order in an aligned or tandem relationship in front of engine 15. The pumps are supported by various brackets and gussets 28 and 29 from chassis 14 so that they project directly out in front of engine 15. The pumps are supported from chassis 14 and/or the engine 15, even though they project out in front of the chassis over the cutter deck.

Pumps 24 and 25 are connected to the wheel motors 19, and pumps 24 and 25 are variable displacement piston pumps with a tilt plate control whereby the flow of hydraulic fluid into and out of the pump is variable and reversible by simply tilting the control plate. Each pump includes a lever or other control linkage that controls the angle of the tilt plate of the pump, and each lever is connected to a control linkage 27 that extends to the driver's seat 21. Further, the pumps 24 and 25 are known as tandem pumps in that the drive shaft 30 of each pump extends from both ends of the pump housing and is connectable to the drive shafts of other aligned pumps. Motors 19 are reversible, fixed displacement motors and the direction of operation of the motors is dependent upon the direction of the flow of hydraulic fluid to and from the motors. With this arrangement, the operator, by operating the control linkages 27 connected to the tiltable plate of each pump can independently control the speed and direction of rotation of each driving wheel 16 or 17 independently of the other driving wheel, so that the driving wheels not only move the mower in forward and rearward directions, but also can function to turn the mower.

Pumps 24 and 25 are closed loop pumps, in that their conduits, such as conduits 31 and 32 of pump 24 are connected directly to its respective hydraulic motor 19.

Pump 26 is a positive displacement gear pump and its conduits 34 and 35 are connected to hydraulic cutter motor 36 of the cutter unit. Pump 26 is nonreversible so that the cutter blades 38 always operate in the proper direction of rotation. Pump 26 and its motor 36 are in an open loop or a closed arrangement. When connected in an open loop arrangement the outlet from motor 36 communicates with a reservoir (not shown) in the lower portion of chassis 14, whereby the reservoir feeds the inlet of the pump 26 and pump 26 has an additional outlet conduit (not shown) which communicates with the fluid loops of pumps 24 and 25 so that pump 26 functions as a charge pump to replace any fluid lost from pumps 24 and 25. Cutter motor 36 is located at the longitudinal axis 41 so that its weight is applied along the centerline of the mower and tends to stabilize the mower and so that the connecting hoses from the pump to the motor are as short as possible and still able to accommodate the relative movements between chassis and cutter deck.

In the embodiment disclosed herein, the cutter unit 12 and power unit 11 are connected together by pivot mount 40, so that the cutter unit is rotatable about a longitudinal axis 41 with respect to the power unit 11. Pivot mount 40 comprises a mounting plate 42 which is rigidly mounted to the vertical front wall 44 of chassis 14. Mounting plate 42 includes side slots 45 and upper slot 46, while vertical front wall 44 of chassis 14 includes side brackets 48 and upper bracket 49, each of which define openings therethrough. Bolts 47 are inserted through slots 45 and 46 and through the openings of brackets 48 and 49 so as to rigidly mount the mounting plate 42 to the vertical front wall 44 of power unit 11.

Pivot mount 40 further includes pivot sleeve 50 and pivot tube 51, with pivot sleeve 50 extending perpendicular to mounting plate 42 and with pivot tube 51 telescopically received within pivot sleeve 50. Gussets 54 reinforce the rigid mounting of pivot sleeve 50 to mounting plate 42, while gussets 55 rigidly mount pivot tube 51 to cutter housing 56. Slot 58 is formed through an arc of pivot sleeve 50, and a bolt 59 extends through slot 58 and is rigidly attached to pivot tube 51. The bolt and slot arrangement permits pivot tube 51 and cutter housing 56 to pivot about longitudinal axis 41, but the bolt and slot arrangement prevents pivot tube 51 from slipping out of the open end of pivot sleeve 58.

Caster wheels 61 and 62 support cutter housing 56. Support arms 63 and 64 are rigidly mounted at one end to the top surface of cutter housing 56 and the support arms extend forwardly of the cutter housing. The wheels 61 and 62 are rotatably supported by wheel clevices 65 which are pivotably attached at their upper ends to support arms 63 and 64. Shims 66 can be mounted above or below the caster socket 68 so as to adjust the height at which the caster wheels 61 and 62 support cutter housing 56. Likewise, the height at which mounting plate 42 is attached to vertical front wall 44 of chassis 14 of the power unit 11 is adjustable by threading the bolts 47 into various ones of the openings of brackets 48 and 49.

From the foregoing description, it will be understood that pivot mount 40 rigidly connects together the power unit 11 and cutter unit 12 in that these units are stable front-to-back and are supported by the rear power wheels 16 and 17 and by the front caster wheels 61 and 62; however, the telescopic connection feature of the pivot mount 40 permits the cutter unit 12 to rotate with respect to power unit 11 which allows all of the wheels of the mower to engage the ground surface even though the ground surface might not be level. Further, this permits the cutter blades 38 to remain parallel to the ground surface on which the caster wheels are supported.

Cutter blades 38 are located within cutter housing 56, with each cutter blade being rotatable about an upwardly extending axis 70 and 71. Sheeves 72 and 73 are mounted on the top surface of cutter housing 56, and a belt drive system 75 drives the sheeves 72 and 73. The belt drive system includes a sheeve 76 rotated by cutter blade motor 36, power belt 77 driven by sheeve 76, transfer sheeve 78 which drives sheeves 79 and 80. Sheeves 79 drives transfer belt 81 of cutter blade sheeve 72, while transfer belt 82 drives cutter blade sheeve 73 from sheeve 80. Idler sheeves 84 and 85 are spring urged into engagement with transfer belts 81 and 82 and tend to maintain the belts in a tight relationship with respect to their sheeves.

While the drawings illustrate transfer sheeve 78, the motor 36 can include a single sheeve or double sheeves for directly driving blade sheeves 72, 73 and 80, with one or with separate drive belts, thereby eliminating the need for connecting belts 77, 81 and 82, and their associated sheaves.

Figure 3:
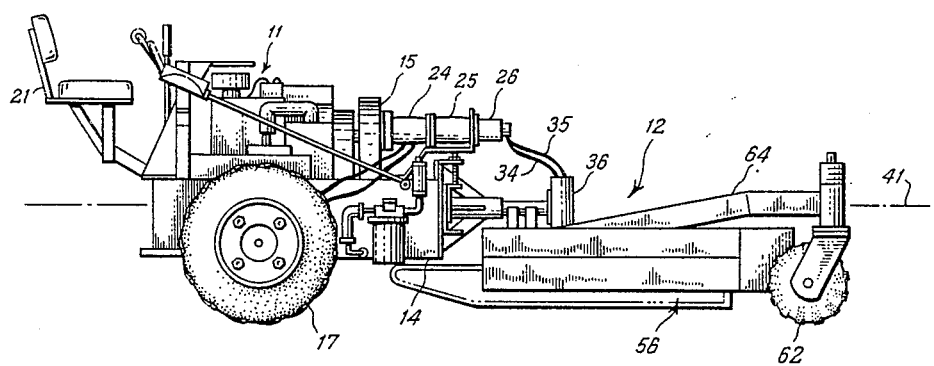
FIG. 3 is a side view of the slope mower, showing how the pumps that are driven by the engine of the power unit are suspended partially over the forwardly positioned cutter unit.

As illustrated in FIG. 3, pumps 24, 25 and 26 project forwardly of power unit 11 over cutter unit 12, with the pumps being arranged in an aligned, tandem relationship with respect to engine 15. As previously described, cutter unit 11 is pivotable about longitudinal axis 41.

Figure 4:
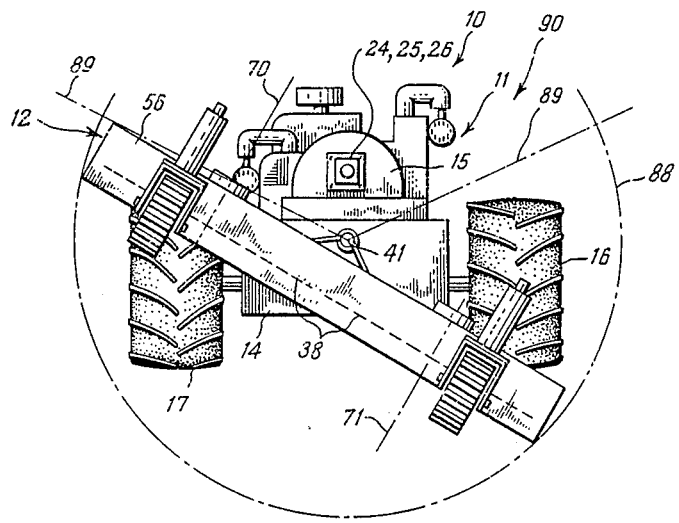
FIG. 4 is a front view of the mower with some elements of the mower removed, showing the arc of movement of the cutter unit with respect to the power unit.

As illustrated in FIG. 4, the arc of movement 88 of the cutter unit extends on opposite sides of the longitudinal axis 41, from positions approximately 25° above horizontal through an arc beneath and about the longitudinal axis 41 to a position approximately 25° above horizontal on the other side of the axis. This arc of movement leaves an envelope above the radius lines 85 over the cutter unit 12 which is never occupied by the cutter unit 12 and which is available for placement of pumps 24, 25 and 26. Thus, even though cutter unit 12 pivots between inclined positions about the longitudinal axis 41, the unoccupied envelope between radius lines 85 above the arc of movement 88 of the cutter unit receives the forward portions of the tandem pumps 24, 25 and 26. Thus, the pumps project forwardly of the power unit 11 and tend to relocate the center of gravity of the power unit further forwardly of the power unit. The use of the flexible conduits 34 and 35 between cutter blade pump 26 mounted on the power unit 11 and cutter motor 36 mounted on the cutter unit 12 allows a fluid connection to be maintained between the pump and its motor, even though there will be relative movement of the pump 26 and motor 36.

While the embodiment of the mower disclosed herein is of a power unit 11 and cutter unit 12 that are pivotably mounted together, it will be understood that the same or similar arrangement of pumps 24, 25 and 26 can be utilized with those slope mowers in which the cutter unit is not pivotably mounted to the power unit. Further, while a series of three pumps has been specifically disclosed, it will be understood that fewer or more pumps can be mounted in a similar arrangement, as may be desirable for performing the functions of the mower. For example, two pumps may be utilized, one pump for powering each wheel motor, and the output shaft of one of the pumps can be utilized to drive a universal linkage that transmits rotary force to the pully system 75 of the cutter unit. Further, a single pump can be utilized to drive a transaxle that powers both driving wheels, with the variation in velocity and change of direction of the wheels being performed by the transaxle instead of by separate pumps. Moreover, separate cutter blade pumps can be used to drive separate cutter blade motors, with each motor mounted separately to a cutter blade.

The pumps also can be arranged in a different sequence. For example, the drawings illustrate the pumps 24 and 25 which drive the wheel motors as being positioned closer to the engine than the pump 26 which drives the cutter motor 36, but the pump 26 can be positioned adjacent the engine, if desired.

While the invention has been described as a slope mower, the invention also relates to mowers that operate primarily on flat surfaces and/or which have cutter decks that are not pivotably connected to the chassis.

It will be understood that the foregoing relates only to a preferred embodiment of the present invention, and that numerous changes and modifications may be made therein without departing from the spirit and scope of the invention as set forth in the following aims.

I claim:

1. A self propelled mower comprising a power unit and a cutter unit,
    said power unit including a chassis, an operator's seat mounted on said chassis, driving wheels mounted on opposite sides of said chassis for supporting said power unit and for moving the power unit along the ground surface in forward and reaward directions, and fluid driven wheel motor means in driving relationship with respect to said driving wheels,
    said cutter unit being positioned in front of said power unit and including a housing, at least one cutter blade rotatably supported about an upwardly extending axis in said housing, a fluid driven cutter blade motor supported by said housing in driving relationship with respect to said cutter blade, and support wheels mounted at opposite sides of said housing for supporting the cutter unit from the ground surface,
    a pivot mounting means connecting said power unit and said cutter unit, said pivot mounting means forming a longitudinal pivot axis extending along the forward direction of movement of the mower about which said cutter unit can pivot with respect to said power unit and forming a substantially rigid connection between said power unit and said cutter unit with respect to the vertical and lateral directions about said pivot axis so that the mower is supported from the ground surface by the driving wheels and the support wheels.
    an engine and pump assembly supported by said power unit and extending from said power unit over the cutter unit, said engine and pump assembly including an internal combustion engine and at least one pump is driven relationship with respect to said engine with conduit in fluid communication between said pump and the fluid driven motor means of said wheels and of said cutter blade motor, whereby said cutter unit is pivotable with respect to the engine and pump assembly below the engine and pump assembly.

2. The mower of claim 1 and wherein said at least one pump comprises a tandem assembly of at least two pumps mounted in front of said engine and positioned above said pivot axis.

3. The mower of claim 2 and wherein said tandem assembly of at least two pumps comprises one pump in fluid driving relationship with each wheel motor and a third pump in fluid driving relationship with the cutter blade motor.

4. The mower of claim 1 and wherein said pivot mounting means is positioned at a level above said cutter housing and said cutter housing is pivotable in an arc of movement extending beneath and about said pivot mounting means, and said engine and pump assembly extend above and out of the arc of movement of said cutter housing.

5. The mower of claim 3 and wherein the pumps in driving relationship with each wheel motor are variable displacement, reversible flow pumps for rotating the driving wheels at variable speeds and in opposite directions of rotation.

6. The mower of claim 1 and wherein said at least one cutter blade comprises a pair of cutter blades rotatably supported by said cutter housing about upwardly extending axes positioned on opposite sides of said horizontal pivot axis, and said fluid driven cutter blade motor is in driving relationship with both of said cutter blades, and wherein said engine and pump assembly includes a pump driven by said engine with conduits in fluid communication with said cutter blade motor.

7. A mower including a power unit and a cutter unit positioned in front of said power unit when the mower is moving in a forward direction,
said power unit including a chassis with driving wheels positioned at each side of said chassis, a fluid driven wheel motor means in driving relationship with respect to each of the wheels of said chassis, an engine mounted to said chassis, a driver's seat mounted to said chassis behind said engine, and pump means arranged in tandem with respect to said engine and driven by said engine, said pump means extending forwardly from said chassis and extending over said cutter unit, said cutter unit including a cutter blade housing with wheels positioned at each side of said housing, at least one cutter blade rotatably supported by said housing and cutter blade motor means mounted on said cutter unit for rotating said cutter blade, and said pump means being connected in fluid driving relationship with respect to at least one of said wheel motor means and said cutter blade motor means.

8. The mower of claim 7 and wherein said pump means comprises at least two pumps arranged in tandem, and wherein said cutter blade motor means comprises a fluid operated cutter blade motor in driving relationship with said blade and driven by one of said tandem pumps.

9. The mower of claim 8 and wherein said tandem pumps comprise three pumps, and wherein said cutter blade motor means is driven by one of said tandem pumps.

10. The mower of claim 7 and further including pivot mounting means attached to said power unit and said cutter unit, said pivot mounting means defining a pivot axis extending along the forward direction of movement of said mower and pivotably supporting said power unit and said cutter unit about said pivot axis, and wherein said engine and said pump means arranged in tandem are arranged parallel to said pivot axis and extend over said pivot mounting means.

11. The mower of claim 7 and further including pivot mounting means attached between said power unit and said cutter unit which enables said cutter unit to pivot with respect to said power unit through a predetermined arc, and wherein the portions of said tandem engine and pump means extending forwardly from said chassis over said cutter unit are positioned above and outside the arc of movement of said cutter unit.

12. The mower of claim 7 and wherein said pump means in driving relationship with said wheel motors comprise two parallel piston pumps with tilt plate control of the displacement of the pistons.

13. The mower of claim 7 and wherein said engine and pump means comprise at least two pumps arranged in series and are positioned centrally along the length of said mower.

14. The mower of claim 13 and said means driven by said engine for rotating said cutter blade comprises a cutter blade pump also mounted on said chassis in aligned relationship with said series pumps and a fluid driven cutter blade motor in driving relationship with said cutter blade and driven by said cutter blade pump.

15. The mower of claim 7 and wherein said at least one cutter blade comprises two cutter blades arranged side-by-side and each cutter blade rotatable about an upwardly extending axis, and wherein said means driven by said engine for rotating said cutter blade comprises a cutter blade pump mounted on said chassis in aligned relationship with said pump means, a fluid driven cutter blade motor mounted on said housing and driven by said cutter blade pump, and belt drive means driven by said cutter blade motor in driving relationship with said cutter blades.

16. A mower including a power unit and a cutter unit positioned in front of said power unit, with said power unit including a chassis with driving wheels mounted to said chassis, an engine and pump assembly mounted on said power unit, said cutter unit including a housing with support wheels mounted to said housing, at least one cutter blade rotatably supported by said housing a fluid driven motor mounted on said housing in driving relationship with respect to said cutter blade, and said engine and pump assembly being connected in fluid drive relationship with respect to said fluid driven motor the improvement therein of pivot mounting means pivotably connecting said power unit and said cutter unit, said pivot mounting means defining a pivot axis extending longitudinally along the length of said mower about which said cutter unit is pivotable with respect to said power unit through an arc of movement extending about said pivot axis, and wherein portions of said engine and pump assembly are suspended over said cutter unit above said pivot axis and outside the arc of movement of said cutter unit.

17. The mower of claim 16 and wherein said power unit includes a fluid driven wheel motor in driving relation with respect to each driving wheel, and wherein the portions of said engine and pump assembly suspended over said cutter unit comprise reversible flow pumps driven by said engine and in driving relationship with said fluid driven wheel motors.

18. A mower including a power unit and a cutter unit positioned in front of said power unit, with said power unit including a chassis with driving wheels mounted to said chassis an engine and pump combination in driving relationship with said driving wheels, said cutter unit including a housing with support wheels mounted to said housing, cutter blades rotatably supported by said housing and driven by said engine and pump combination, the improvement therein of mounting means pivotably connecting said cutter unit to said power unit, said mounting means defining a pivot axis extending along the forward direction of movement of the mower about which said cutter unit can pivot with respect to said power unit in an envelope of movement, and wherein said engine and pump combination extends forwardly from said power unit and is suspended over said cutter unit and over said mounting means outside the envelope of movement of said cutter unit with respect to said power unit.

19. The mower of claim 18 and wherein the engine and pump combination suspended over said cutter unit comprise a tandem arrangement of pumps driven by said engine.

* * * * *

UNITED STATES PATENT AND TRADEMARK OFFICE
CERTIFICATE OF CORRECTION

PATENT NO. : 4,876,846
DATED      : October 31, 1989
INVENTOR(S): Robert M. Torras It is certified that error appears in the above—identified patent and that said Letters Patent is hereby corrected as shown below:

Column 6, line 64, after "pump" change "is" to --in--.

Column 6, line 65, after "with" change "conduit" to --conduits--.

Column 8, line 44, insert a comma (,) after "housing".

Column 8, line 49, insert a comma (,) after "motor".

Signed and Sealed this

Thirtieth Day of October, 1990

Attest:

HARRY F. MANBECK, JR.

*Attesting Officer*     *Commissioner of Patents and Trademarks*